(12) United States Patent
Umeyama et al.

(10) Patent No.: US 9,705,111 B2
(45) Date of Patent: Jul. 11, 2017

(54) SECONDARY BATTERY AND METHOD FOR MANUFACTURING THE SAME

(71) Applicant: TOYOTA JIDOSHA KABUSHIKI KAISHA, Toyota-shi, Aichi-ken (JP)

(72) Inventors: Hiroya Umeyama, Okazaki (JP); Hiroshi Takamatsu, Moriguchi (JP); Yukio Harima, Hirakata (JP); Yasushi Hirakawa, Moriguchi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 85 days.

(21) Appl. No.: 14/692,182

(22) Filed: Apr. 21, 2015

(65) Prior Publication Data

US 2015/0349303 A1    Dec. 3, 2015

(30) Foreign Application Priority Data

Jun. 2, 2014   (JP) .................. 2014-113961

(51) Int. Cl.

| | |
|---|---|
| *H01M 2/00* | (2006.01) |
| *H01M 2/04* | (2006.01) |
| *B23K 26/20* | (2014.01) |
| *B23K 26/06* | (2014.01) |
| *B23K 26/24* | (2014.01) |

(Continued)

(52) U.S. Cl.
CPC ......... *H01M 2/043* (2013.01); *B23K 26/0608* (2013.01); *B23K 26/20* (2013.01); *B23K 26/24* (2013.01); *H01M 2/0426* (2013.01); *H01M 2/0439* (2013.01); *B23K 2201/36* (2013.01); *B23K 2203/10* (2013.01); *H01M 2220/20* (2013.01)

(58) Field of Classification Search
CPC ...... H01M 2/043; H01M 2/0426; H01M 2/04; H01M 2/0473; H01M 2/0439; H01M 2/0434; B23K 26/0608; B23K 26/20; B23K 26/24; B23K 26/3226
See application file for complete search history.

(56) References Cited

U.S. PATENT DOCUMENTS

| | | |
|---|---|---|
| 2007/0128514 A1 | 6/2007 | Yoshida |
| 2008/0116175 A1 | 5/2008 | Ballerini et al. |
| 2011/0095003 A1 | 4/2011 | Sakurai et al. |

FOREIGN PATENT DOCUMENTS

| | | |
|---|---|---|
| JP | 11-090657 A | 4/1999 |
| JP | 2002-292486 A | 10/2002 |

(Continued)

*Primary Examiner* — Raymond Alejandro
(74) *Attorney, Agent, or Firm* — Sughrue Mion, PLLC (57) ABSTRACT

Provided is a secondary battery in which a battery lid is fixed to a battery case by inserting the battery lid into an opening of the battery case having the opening, and emitting laser beams to a butting portion between the battery case and the battery lid to perform butt welding, wherein, when a battery lid-side welding mark formed in the battery lid has a distance from a surface of the battery lid to a lower end of the battery lid-side welding mark which is defined as a battery lid-side welding depth, and a battery case-side welding mark formed in the battery case has a distance from the surface of the battery lid to a lower end of the battery case-side welding mark which is defined as a battery case-side welding depth, the battery lid-side welding depth is deeper than the battery case-side welding depth.

3 Claims, 8 Drawing Sheets (51) Int. Cl.
    *B23K 101/36*     (2006.01)
    *B23K 103/10*     (2006.01)

(56) References Cited

FOREIGN PATENT DOCUMENTS

| | | | | |
|---|---|---|---|---|
| JP | 2006-324160 A | 11/2006 | | |
| JP | 2007-157519 A | 6/2007 | | |
| JP | 2008-126315 A | 6/2008 | | |
| JP | 2011-92944 | * 5/2011 | ............. | B23K 26/20 |
| JP | 2011-092944 A | 5/2011 | | |
| JP | 2013220462 A | 10/2013 | | |

* cited by examiner

| NAME | LASER BEAM OUTPUT(W) (LASER BEAM OUTPUT RATIO) | LID SIDE | CASE SIDE | LASER BEAM DIAMETER (mm) | RATIO | FUSED SHAPE BATTERY CASE-SIDE WELDING DEPTH(D1)(mm) | BATTERY LID-SIDE WELDING DEPTH(D2)(mm) | [D2/D1] ×100% |
|---|---|---|---|---|---|---|---|---|
| EXAMPLE 1 | (1.6:1) | 831 | 519 | 0.04 | 10% | 0.73 | 0.47 | 65% |
| EXAMPLE 2 | (1.45:1) | 799 | 551 | 0.04 | 10% | 0.69 | 0.51 | 75% |
| EXAMPLE 3 | (1.3:1) | 763 | 587 | 0.04 | 10% | 0.65 | 0.55 | 85% |
| EXAMPLE 4 | (1.8:1) | 868 | 482 | 0.08 | 20% | 0.72 | 0.42 | 58% |
| EXAMPLE 5 | (1.6:1) | 831 | 519 | 0.08 | 20% | 0.71 | 0.45 | 63% |
| EXAMPLE 6 | (1.45:1) | 799 | 551 | 0.08 | 20% | 0.61 | 0.49 | 80% |
| EXAMPLE 7 | (1.3:1) | 763 | 587 | 0.08 | 20% | 0.63 | 0.53 | 84% |
| EXAMPLE 8 | (1.1:1) | 707 | 643 | 0.08 | 20% | 0.61 | 0.55 | 90% |
| COMPARATIVE EXAMPLE 1 | (1.05:1) | 691 | 659 | 0.04 | 10% | 0.60 | 0.60 | 100% |
| COMPARATIVE EXAMPLE 2 | (1:1) | 675 | 675 | 0.04 | 10% | 0.55 | 0.65 | 110% |
| COMPARATIVE EXAMPLE 3 | (1.8:1) | 868 | 482 | 0.02 | 5% | NOT WELDED | | |
| COMPARATIVE EXAMPLE 4 | (1.6:1) | 831 | 519 | 0.02 | 5% | NOT WELDED | | |
| COMPARATIVE EXAMPLE 5 | (1.45:1) | 799 | 551 | 0.02 | 5% | NOT WELDED | | |
| COMPARATIVE EXAMPLE 6 | (1.3:1) | 763 | 587 | 0.02 | 5% | NOT WELDED | | |
| COMPARATIVE EXAMPLE 7 | (1.1:1) | 707 | 643 | 0.02 | 5% | NOT WELDED | | |
| COMPARATIVE EXAMPLE 8 | (1.05:1) | 691 | 659 | 0.02 | 5% | NOT WELDED | | |
| COMPARATIVE EXAMPLE 9 | (1:1) | 675 | 675 | 0.02 | 5% | NOT WELDED | | |
| COMPARATIVE EXAMPLE 10 | (1.8:1) | 868 | 482 | 0.12 | 25% | 0.75 | NO PEAK | |
| COMPARATIVE EXAMPLE 11 | (1.6:1) | 831 | 519 | 0.12 | 25% | 0.73 | NO PEAK | |
| COMPARATIVE EXAMPLE 12 | (1.45:1) | 799 | 551 | 0.12 | 25% | 0.69 | NO PEAK | |
| COMPARATIVE EXAMPLE 13 | (1.3:1) | 763 | 587 | 0.12 | 25% | 0.65 | NO PEAK | |
| COMPARATIVE EXAMPLE 14 | (1.1:1) | 707 | 643 | 0.12 | 25% | 0.63 | NO PEAK | |
| COMPARATIVE EXAMPLE 15 | (1.05:1) | 691 | 659 | 0.12 | 25% | 0.60 | NO PEAK | |
| COMPARATIVE EXAMPLE 16 | (1:1) | 675 | 675 | 0.12 | 25% | 0.55 | NO PEAK | |

FIG.7

AVERAGE VALUE
(MINIMUM VALUE TO
MAXIMUM VALUE)

| | BOUNDARY SURFACE PENETRATION DEPTH D3(mm) | TENSILE STRENGTH (N/mm) | EVALUATION |
|---|---|---|---|
| EXAMPLE 1 | 0.58 (0.55~0.64) | 58 (55~62) | WHEN CASE PEAK IS MORE THAN OR EQUAL TO 65% RELATIVE TO LID PEAK, FUSION IS ENOUGH TO FILL GAP BETWEEN LID AND CASE, AND PENETRATION DEPTH IS STABILIZED. IN TENSILE TEST, RUPTURE OCCURS FROM BOUNDARY BETWEEN FUSED PORTION AND CASE. |
| EXAMPLE 2 | 0.62 (0.58~0.65) | 61 (59~63) | NO CRACK OCCURS IN PENETRATION. IN TENSILE TEST, RUPTURE OCCURS FROM BOUNDARY BETWEEN FUSED PORTION AND CASE. |
| EXAMPLE 3 | 0.65 (0.62~0.67) | 62 (60~63) | WHEN CASE PEAK IS LESS THAN OR EQUAL TO 85% RELATIVE TO LID PEAK, SOLIDIFICATION IS STARTED FROM BOUNDARY IN VICINITY OF CASE PEAK, AND THUS NO CRACK OCCURS AND TENSILE STRENGTH IS NOT REDUCED. IN TENSILE TEST, RUPTURE OCCURS FROM BOUNDARY BETWEEN FUSED PORTION AND CASE. |
| COMPARATIVE EXAMPLE 1 | 0.64 (0.61~0.67) | 30 (18~45) | WHEN LID AND CASE HAVE SIMILAR FUSION AMOUNTS, SOLIDIFICATION IS STARTED EARLIER IN LID DUE TO MAGNITUDE OF HEAT CAPACITY, AND THEREBY CRACK OCCURS IN CASE, CAUSING REDUCTION IN TENSILE STRENGTH. |
| COMPARATIVE EXAMPLE 2 | 0.60 (0.56~0.62) | 18 (15~37) | SINCE LID HAS SMALL HEAT INPUT AND LARGE HEAT CAPACITY, LID SOLIDIFIES EARLIER, AND CRACK OCCURS ON CASE SIDE, CAUSING REDUCTION IN TENSILE STRENGTH. |

SECONDARY BATTERY AND METHOD FOR MANUFACTURING THE SAME

This nonprovisional application is based on Japanese Patent Application No. 2014-113961 filed on Jun. 2, 2014 with the Japan Patent Office, the entire contents of which are hereby incorporated by reference.

BACKGROUND OF THE INVENTION

Field of the Invention

The present invention relates to a secondary battery and a method for manufacturing the same.

Description of the Background Art

In storage elements such as a lithium ion secondary battery, a sodium battery, an electric double layer capacitor, and a lithium ion capacitor, for example, a power generation element which generates electric power is housed in a bottomed battery case, a battery lid is inserted into an opening of the battery case, and a laser beam is emitted to a butting portion between the battery case and the battery lid to perform butt welding.

Japanese Patent Laying-Open Nos. 2011-092944, 2007-157519, 2008-126315, 2006-324160, 11-90657, and 2002-292486 each disclose a welding structure in which a battery lid is fixed to a battery case using a laser beam.

SUMMARY OF THE INVENTION

In recent years, secondary batteries are required to have a higher capacity. Since it is necessary to provide terminals on a battery lid, the battery lid is required to have rigidity and a certain amount of plate thickness. However, a battery case tends to have a thinner plate thickness in order to increase capacity. As a result, in butt welding between a battery lid and a battery case, a difference in heat capacity between the battery lid and the battery case is increased, and relatively, the battery lid has a larger heat capacity and is difficult to melt, whereas the battery case has a smaller heat capacity and is easy to melt.

When a laser beam is emitted for welding, the battery lid and the battery case expand with heat and contract during condensation. After fusion, the battery lid having a larger heat capacity cools down earlier and condenses. On this occasion, since the battery lid has a larger thickness, the contraction amount of the battery lid is larger than that of the battery case, and it is difficult for the battery case having a smaller thickness to follow (compensate for) a contracted volume of the battery lid. As a result, a crack occurs on the side of the battery case having a smaller heat capacity, and there is concern over a reduction in welding strength between the battery lid and the battery case.

The technique disclosed in Japanese Patent Laying-Open No. 2011-092944 discloses a bonding method which emits a first laser beam to a member having a larger heat capacity (battery lid) and emits a second laser beam having an intensity lower than that of the first laser beam to a member having a smaller heat capacity (battery case), to form a key hole in each of the first member and the second member. Thus, there is an increased possibility that, after fusion, the member having a larger heat capacity (battery lid) cools down earlier and condenses, and a crack occurs on the side of the member having a smaller heat capacity (battery case).

Japanese Patent Laying-Open No. 2007-157519 discloses a technique which improves rupture strength by increasing a fusion boundary using a slot provided in a side surface of a battery lid. Japanese Patent Laying-Open No. 2008-126315 discloses a technique which welds a workpiece using two laser beams, wherein a penetration depth of a first laser beam is shallower than a penetration depth of a second laser beam. Japanese Patent Laying-Open No. 2006-324160 discloses a technique in which the thickness of a butting portion is thinner than the thickness of a battery lid, and a welding beat is formed to extend lower than a butting surface. Japanese Patent Laying-Open No. 11-90657 discloses a technique in which a penetration region of a battery lid is formed to be shallower at corner portions than at long-side portions of the battery lid. Japanese Patent Laying-Open No. 2002-292486 discloses a technique which decreases reflectance of a laser beam to a battery lid having a poor heat fusibility to be lower than that to a battery case, to improve the heat fusibility of the battery lid and achieve a good penetration state.

The present invention has been made in view of a problem that a difference in heat capacity between a battery lid and a battery case is increased, and the battery lid has a larger heat capacity and is difficult to melt, whereas the battery case has a smaller heat capacity and is easy to melt. One object of the present invention is to provide a secondary battery capable of ensuring welding strength in butt welding between a battery lid and a battery case, and suppressing occurrence of a crack on the side of the battery case having a heat capacity relatively smaller than that of the battery lid, and a method for manufacturing the same.

The secondary battery is a secondary battery in which a battery lid is fixed to a battery case by inserting the battery lid into an opening of the battery case having the opening, and emitting laser beams to a butting portion between the battery case and the battery lid to perform butt welding, wherein, when a battery lid-side welding mark formed in the battery lid has a distance from a surface of the battery lid to a lower end of the battery lid-side welding mark which is defined as a battery lid-side welding depth, and a battery case-side welding mark formed in the battery case has a distance from the surface of the battery lid to a lower end of the battery case-side welding mark which is defined as a battery case-side welding depth, the battery lid-side welding depth is deeper than the battery case-side welding depth.

According to the secondary battery, by setting the battery lid-side welding depth to be deeper than the battery case-side welding depth in the battery case-side welding mark and the battery lid-side welding mark, a boundary of fusion by welding can be inclined. As a result, a welding boundary between the battery lid and the battery case can be formed to have a relatively long length, and bonding strength between the battery lid and the battery case can be improved, when compared with a case where a bonding length between the battery lid and the battery case is short.

Further, the method for manufacturing the secondary battery is a method for manufacturing a secondary battery, which fixes a battery lid to a battery case by inserting the battery lid into the battery case having an opening, and emitting laser beams to a fitting portion between the battery case and the battery lid to perform butt welding, including the step of emitting a first laser beam to the battery lid, and emitting a second laser beam to the battery case, wherein an intensity of the first laser beam is greater than an intensity of the second laser beam.

According to the method for manufacturing the secondary battery, in the secondary battery in which the battery lid is fixed to the battery case by butt welding by emitting laser beams, the battery lid-side welding depth is formed to be deeper than the battery case-side welding depth. Thereby, the battery lid side is welded greater than the battery case side, and thus the battery lid is in a higher temperature state than the battery case. As a result, solidification is started from the side of the battery case having a relatively low temperature, and occurrence of a crack on the battery case side can be suppressed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a view showing laser output ratios and fused states in Examples 1 to 8 and Comparative Examples 1 to 16.

DESCRIPTION OF THE PREFERRED EMBODIMENTS

Hereinafter, an embodiment in one example based on the present invention will be described with reference to the drawings. When the number, amount, or the like is referred to in the embodiment described below, the scope of the present invention is not necessarily limited to such a number, amount, or the like, unless otherwise specified. Identical or corresponding parts will be designated by the same reference numerals, and an overlapping description may not be repeated. It is originally intended to combine features in the embodiment as appropriate for use. In addition, the drawings are not drawn to actual scale, and are drawn with partially different ratios to facilitate understanding of a structure.

[Overall Configuration of Secondary Battery 10]

Figure 1:
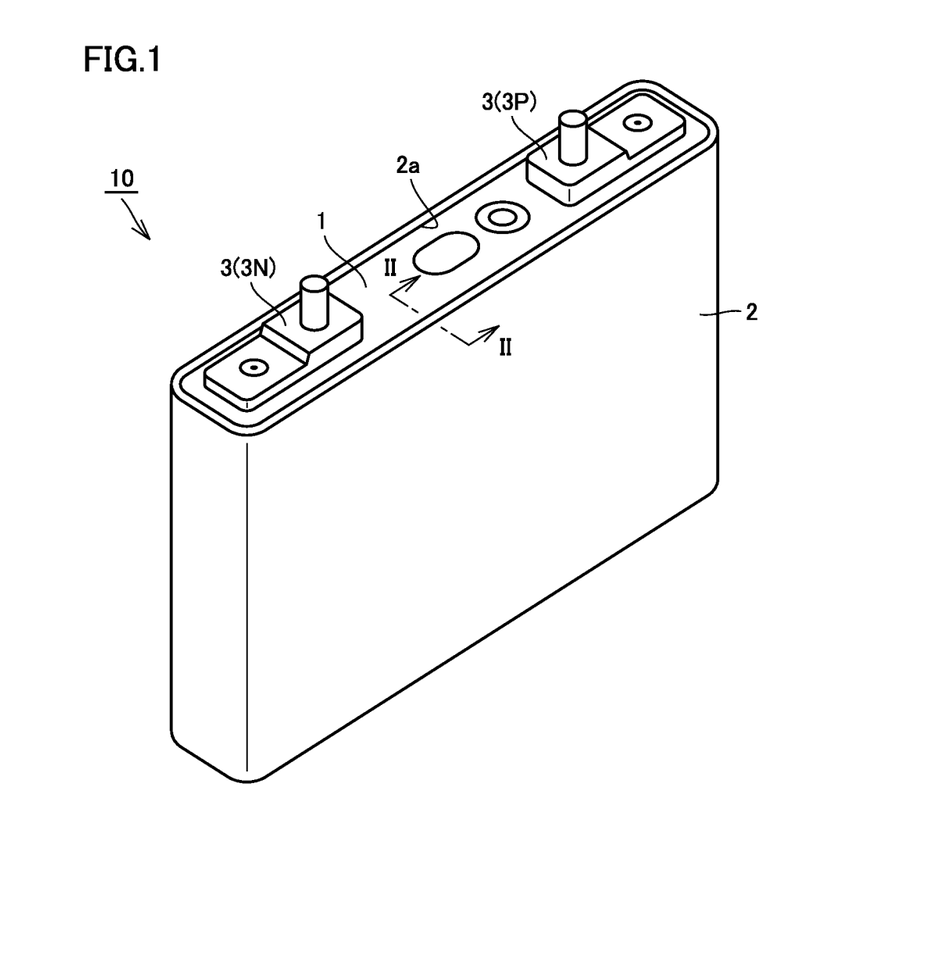
FIG. 1 is a perspective view showing an overall configuration of a secondary battery in an embodiment.

An overall configuration of a secondary battery 10 in the present embodiment will be described with reference to FIG. 1. FIG. 1 is a perspective view showing an overall configuration of secondary battery 10 in the present embodiment. Secondary battery 10 is a nonaqueous electrolyte secondary battery, and a plurality of secondary batteries 10 are combined in series to form a battery pack, which is suitably mounted in a hybrid vehicle or the like. The battery pack serves as a motive power source for the hybrid vehicle, together with an internal combustion engine such as a gasoline engine or a diesel engine. However, the structure of secondary battery 10 described below is not limited to a nonaqueous electrolyte secondary battery.

Secondary battery 10 has a battery element (not shown), a battery case 2 housing the battery element, a battery lid 1, a positive electrode terminal 3P, and a negative electrode terminal 3N. Positive electrode terminal 3P and negative electrode terminal 3N are provided outside battery case 2, as external terminals 3 of secondary battery 10.

Battery case 2 has a shape of a bottomed, substantially rectangular parallelepiped case having an opening 2a in one direction, and the battery element is housed therein. Battery lid 1 has a shape of a flat plate having a rectangular plan view, and is fitted to cover opening 2a provided in battery case 2. For battery case 2 and battery lid 1, a metal material such as aluminum is used.

[State of Butt Welding]

Figure 2:
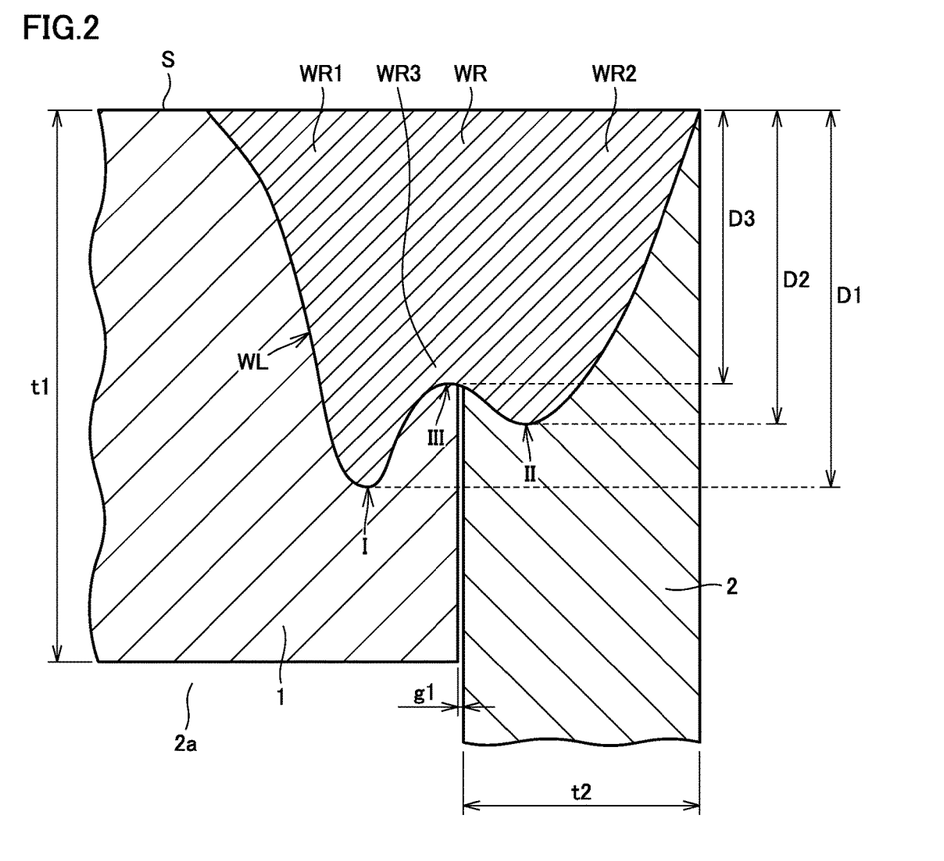
FIG. 2 is a cross sectional view showing a state of butt welding between a battery lid and a battery case, in a cross section taken along a line II-II and viewed in the direction of arrows in FIG. 1.

Next, a state of butt welding between battery lid 1 and battery case 2 will be described with reference to FIG. 2. It is noted that FIG. 2 is a cross sectional view showing a state of butt welding between the battery lid and the battery case, in a cross section taken along a line II-II and viewed in the direction of arrows in FIG. 1.

Battery lid 1 is fitted to cover opening 2a provided in battery case 2. A minute gap g1 is provided between battery lid 1 and battery case 2. In the present embodiment, gap g1 is approximately 50 μm. Aluminum is used for battery lid 1, and a plate thickness t1 is approximately 1.4 mm. Aluminum is used for battery case 2, and a plate thickness t2 is approximately 0.4 mm.

Between battery lid 1 and battery case 2, a welding mark WR formed by butt welding is formed to extend between battery lid 1 and battery case 2. Welding mark WR extends from a surface S of battery lid 1 in a thickness direction of battery lid 1, and has a battery lid-side welding mark WR1 on the battery lid 1 side and a battery case-side welding mark WR2 on the battery case 2 side. Battery lid-side welding mark WR1 and battery case-side welding mark WR2 are integrated to form welding mark WR. Welding mark WR is a region where an aluminum material for battery lid 1 and battery case 2 once fuses by heat at the time of butt welding, then condenses and thus is recrystallized, and a boundary WL can be observed between welding mark WR and non-fused regions of battery lid 1 and battery case 2.

Figure 8:
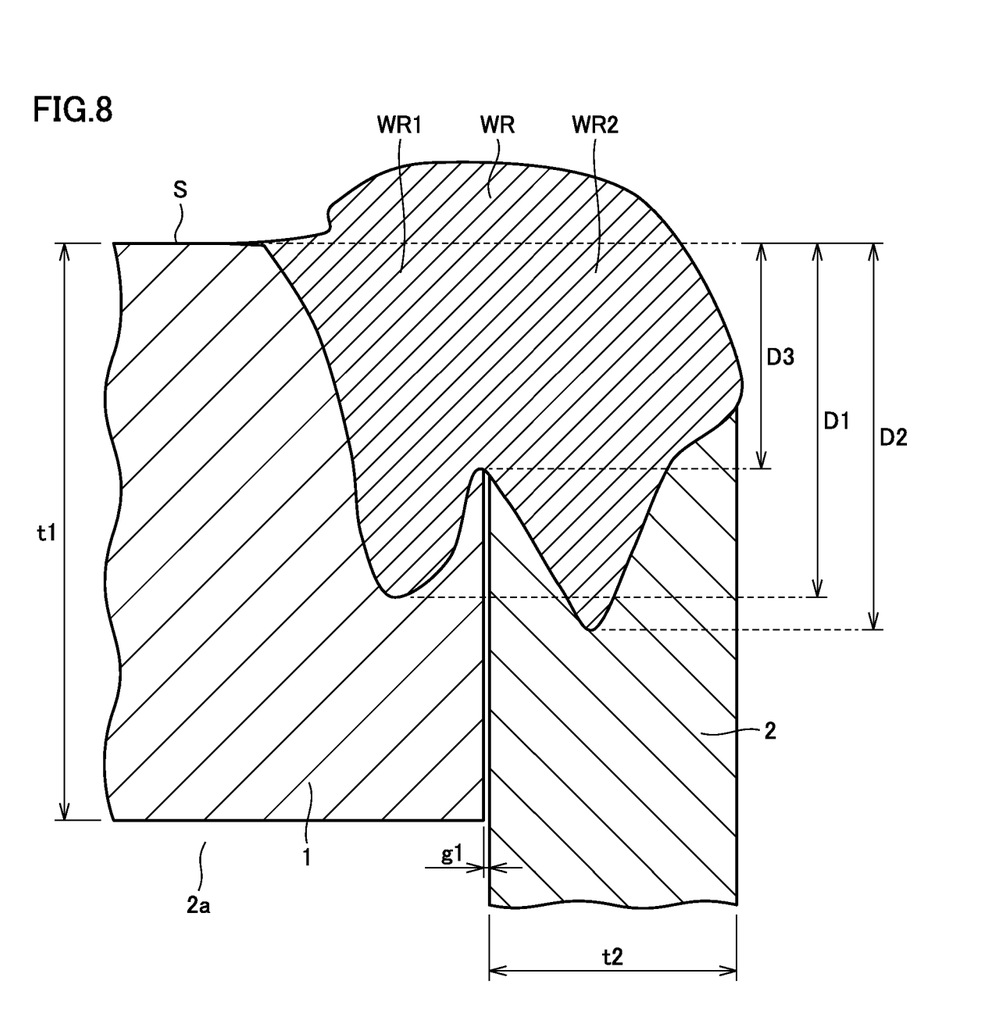
FIG. 8 is a cross sectional view showing a state of butt welding between a battery lid and a battery case in a comparative example.

Surface S of battery lid 1 refers to a surface of battery lid 1 whose position does not change before and after welding, although the surface of surface S of battery lid 1 may rise by welding after welding as shown in FIG. 8 described later.

In welding mark WR, when battery lid-side welding mark WR1 formed in battery lid 1 has a distance from surface S of battery lid 1 to a lower end I of battery lid-side welding mark WR1 which is defined as a battery lid-side welding depth D1, and battery case-side welding mark WR2 formed in battery case 2 has a distance from surface S of battery lid 1 to a lower end II of battery case-side welding mark WR2 which is defined as a battery case-side welding depth D2, battery lid-side welding depth D1 is formed to be deeper than battery case-side welding depth D2.

In addition, between battery lid-side welding mark WR1 and battery case-side welding mark WR2 is formed a penetration region WR3 whose distance from surface S of battery lid 1 to a lower end III has a depth D3 shallower than battery lid-side welding depth D1 and battery case-side welding depth D2. Penetration region WR3 is located substantially at a boundary region between battery lid 1 and battery case 2. As a result, in welding mark WR, boundary WL has a substantially W shape. Lower ends I, II, and III described above each refer to a point at which the slope of a tangent to boundary WL is 0°.

It is noted that, as long as battery lid-side welding depth D1 is formed to be deeper than battery case-side welding depth D2 in welding mark WR, depth D3 of penetration region WR3 may be identical to battery case-side welding depth D2 of battery case-side welding mark WR2.

[Method for Butt-Welding Battery Lid 1 and Battery Case 2]

Next, a method for fixing battery lid 1 to battery case 2 by inserting battery lid 1 into battery case 2 having opening 2a, and emitting laser beams to a fitting portion between battery lid 1 and battery case 2 to perform butt welding will be described, as a method for manufacturing secondary battery 10 having the configuration described above, with reference to FIGS. 3 and 4. It is noted that FIG. 3 is a view showing a method for butt-welding battery lid 1 and battery case 2 of secondary battery 10 (method for manufacturing secondary battery 10) in the present embodiment, and FIG. 4 is a view showing a schematic configuration of a welding device used to butt-weld battery lid 1 and battery case 2 of secondary battery 10.

Figure 3:
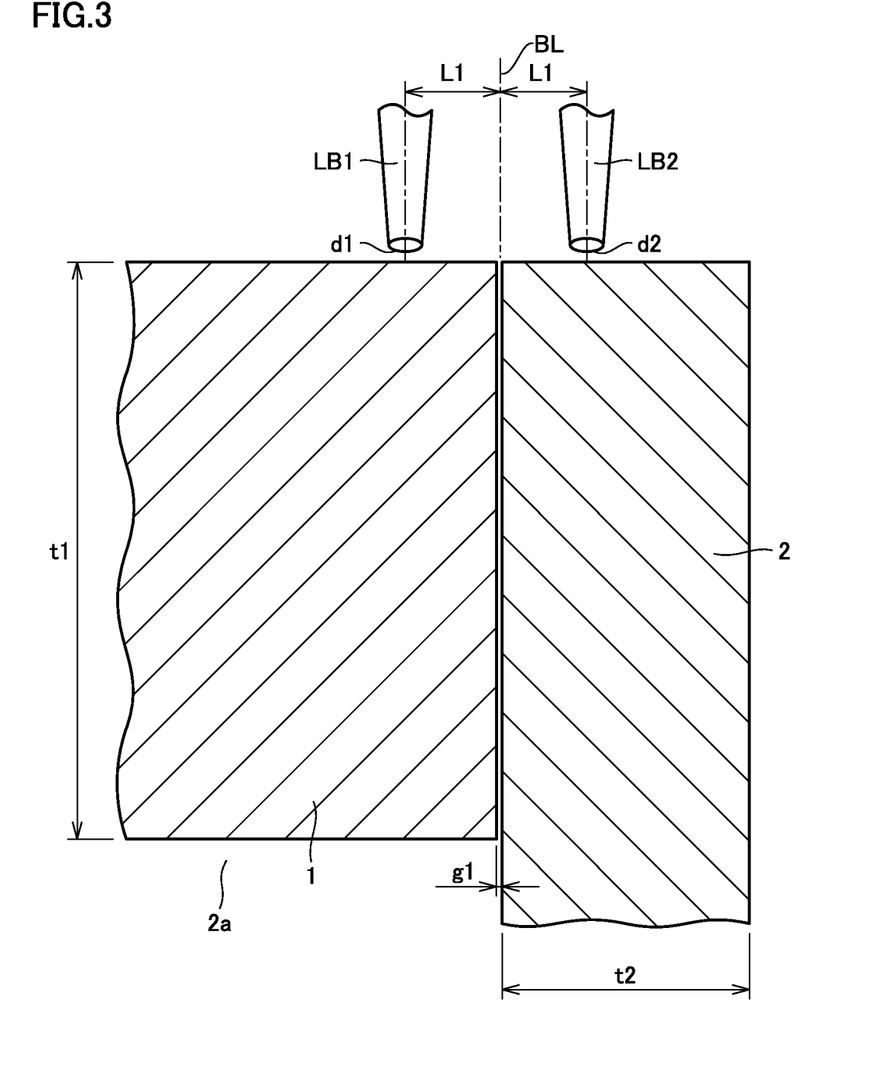
FIG. 3 is a view showing a method for butt-welding the battery lid and the battery case of the secondary battery (method for manufacturing the secondary battery) in the embodiment.

Referring to FIG. 3, a first laser beam LB1 is emitted to battery lid 1, and a second laser beam LB2 is emitted to battery case 2. First laser beam LB1 and second laser beam LB2 are emitted at locations L1 which are equally spaced from a boundary BL between battery lid 1 and battery case 2. In the present embodiment, L1 is a location spaced from boundary BL by approximately 0.15 mm.

In the form of the present embodiment, an intensity of first laser beam LB1 is greater than an intensity of second laser beam LB2, an emitted laser beam diameter d1 of first laser beam LB1 is a beam diameter which is 10% to 20% of thickness t1 of battery lid 1, and an emitted laser beam diameter d2 of second laser beam LB2 is a beam diameter which is 10% to 20% of thickness t2 of battery case 2. Concrete beam intensities and emitted laser beam diameters of first laser beam LB1 and second laser beam LB2 will be described in examples described later.

Figure 4:
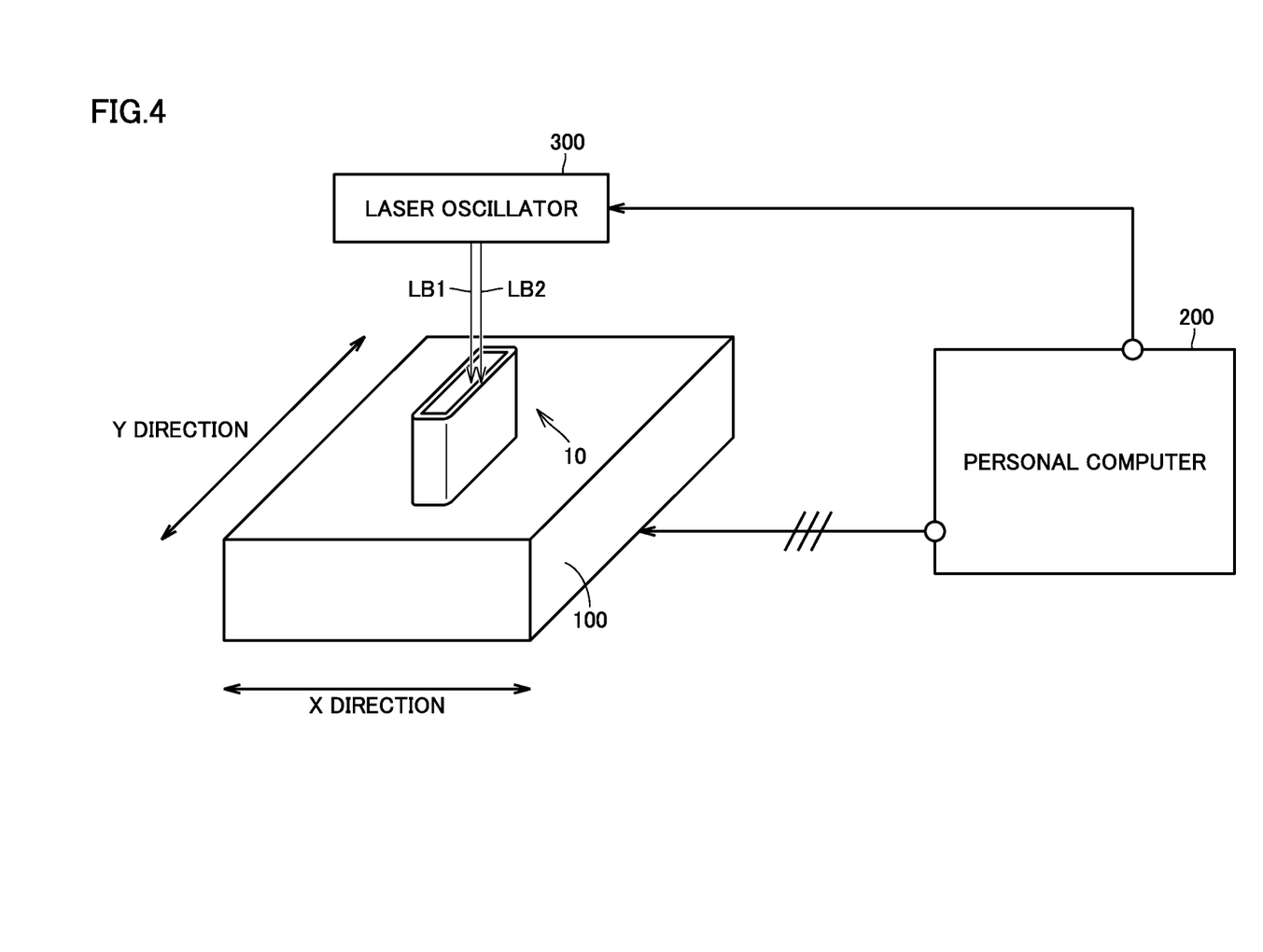
FIG. 4 is a view showing a schematic configuration of a welding device used to butt-weld the battery lid and the battery case of the secondary battery.

FIG. 4 shows a concrete welding device. Secondary battery 10 as an object to be welded is fixed on a table 100. Table 100 is movable in horizontal X and Y directions. Above secondary battery 10 is provided a laser oscillator 300 which emits laser beams to table 100 in a vertically downward direction. First laser beam LB1 and second laser beam LB2 are emitted from laser oscillator 300.

In the present embodiment, a personal computer 200 is used as a control device, in order to control movement of table 100, and to control emission of first laser beam LB1 and second laser beam LB2 by laser oscillator 300. It is noted that an exclusive controller may be used as a control device.

Figure 5:
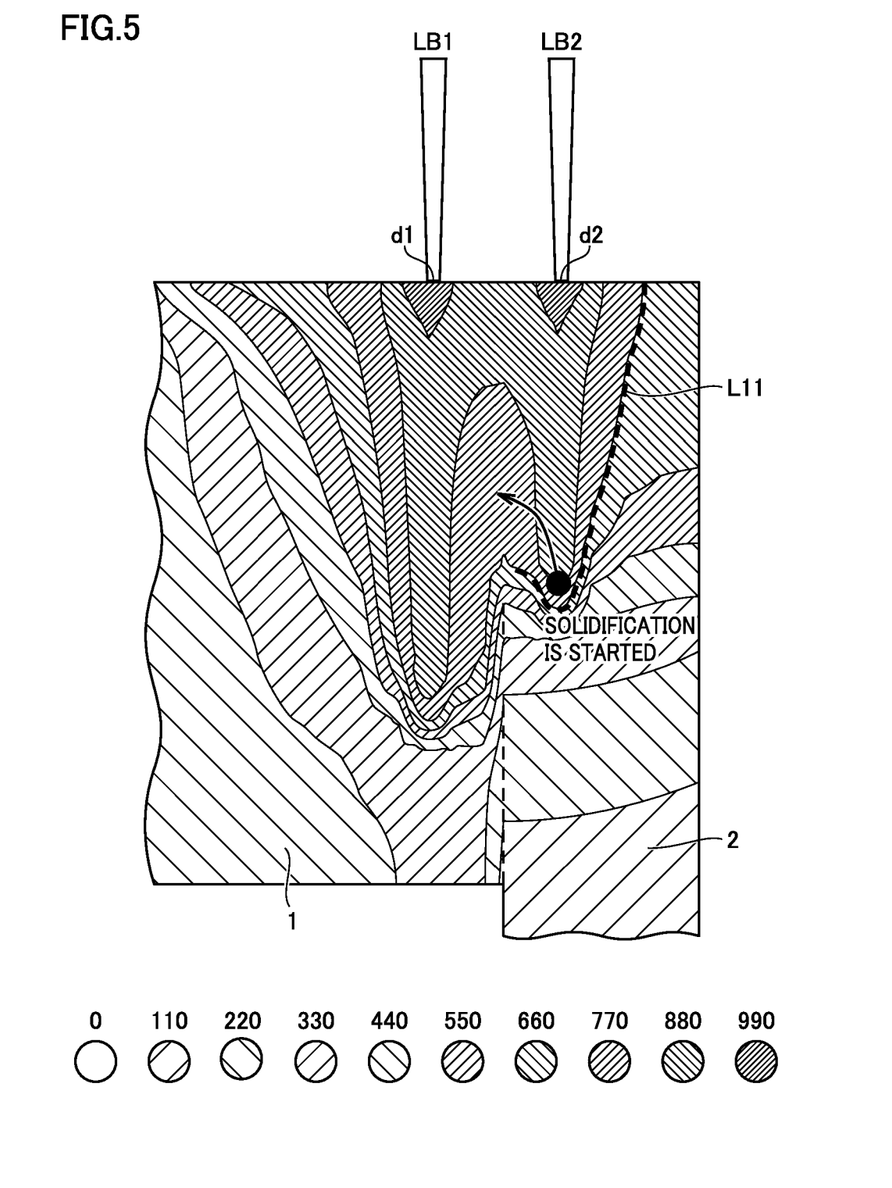
FIG. 5 is a view showing internal temperature distribution (CAE analysis) in the battery lid and the battery case of the secondary battery, at the time of butt welding between the battery lid and the battery case.

[Temperature Distribution in Battery Lid 1 and Battery Case 2]Next, temperature distribution in battery lid 1 and battery case 2 in butt welding between battery lid 1 and battery case 2 using the above welding device will be described with reference to FIG. 5. FIG. 5 is a view showing internal temperature distribution (CAE (Computer Aided Engineering) analysis) in battery lid 1 and battery case 2 of secondary battery 10, at the time of butt welding between battery lid 1 and battery case 2. In FIG. 5, temperature states of 0° C. to 990° C. are expressed using 10-step hatch patterns.

In the present embodiment, as described above, the intensity of first laser beam LB 1 emitted to battery lid 1 is greater than the intensity of second laser beam LB2 emitted to battery case 2, emitted laser beam diameter d1 of first laser beam LB1 is a beam diameter which is 10% to 20% of thickness t1 of battery lid 1, and emitted laser beam diameter d2 of second laser beam LB2 is a beam diameter which is 10% to 20% of thickness t2 of battery case 2. Thereby, battery lid 1 is in a higher temperature state than battery case 2, and, in the thickness direction of battery lid 1, a high temperature position reaches a deeper position in battery lid 1, when compared with battery case 2.

By forming such temperature distribution, the battery lid 1 side fuses greater than the battery case 2 side, and relatively, the battery lid 1 side is in a high temperature state, and the battery case 2 side is in a low temperature state. As a result, the amount of heat is greater in battery lid 1 than that in battery case 2. In addition, since heat conductivity of battery lid 1 and battery case 2 is much higher than heat conductivity of air, heat is dissipated in a downward direction, and is further directed toward the inside of battery lid 1. As a result, battery case 2 starts solidification earlier than battery lid 1.

Here, when a metal is cooled and hardened, its volume contracts. Since battery case 2 having a smaller contraction amount starts solidification earlier than battery lid 1 having a larger contraction amount, it is possible to perform welding which performs fusion and solidification such that no crack or the like occurs in the vicinity of the boundary between battery lid 1 and battery case 2.

Further, since the high temperature position reaches a deeper position in battery lid 1 when compared with battery case 2, the fusion amount of battery lid 1 increases, and the amount (length) of the gap present at the boundary between battery lid 1 and battery case 2 can be decreased. Thus, a stable fusion bonding state between battery lid 1 and battery case 2 can be achieved.

Furthermore, as a state after fusion, it is considered that the strength of the boundary between battery lid 1 and battery case 2 is reduced, and when a load is applied, rupture occurs from the boundary. In the present embodiment, the boundary between battery lid 1 and battery case 2 can be formed to have a relatively long length, as indicated by a thick broken line L11 in FIG. 5. Thereby, bonding strength between battery lid 1 and battery case 2 can be improved, when compared with a case where the bonding length therebetween is short.

Specifically, since battery lid-side welding depth D1 is formed to be deeper than battery case-side welding depth D2, thick broken line L11 serving as a boundary of fusion by welding has a steep (close to vertical) inclination, as shown in FIG. 5. In contrast, if thick broken line L11 is, for example, close to horizontal, the length of thick broken line L11 (the length of the boundary) is short, which results in a weak bonding strength, when compared with the case where thick broken line L11 is long.

Accordingly, by forming battery lid-side welding depth D1 to be deeper than battery case-side welding depth D2 as shown in the present embodiment, the boundary between battery lid 1 and battery case 2 can be formed to have a long length, and bonding strength between battery lid 1 and battery case 2 can be improved.

EXAMPLES

Figure 7:
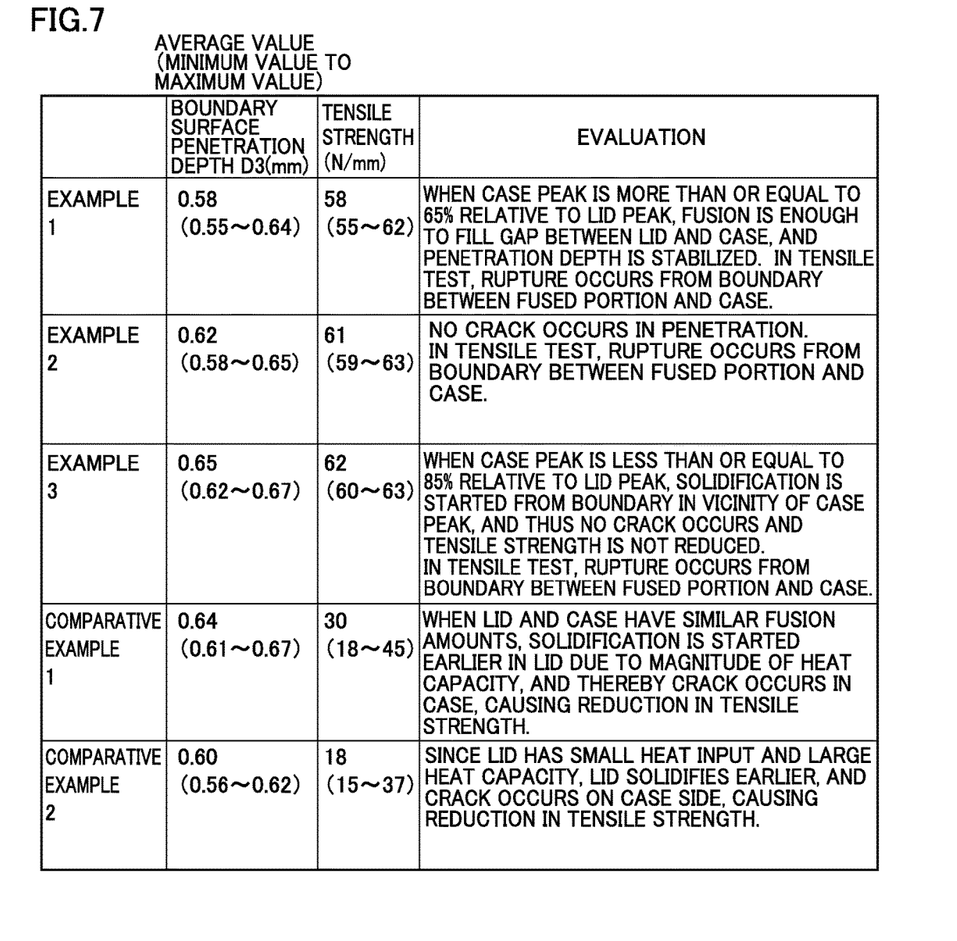
FIG. 7 is a view showing boundary surface penetration depths, tensile strengths, and evaluations in Examples 1 to 3 and Comparative Examples 1 and 2.

Next, examples of the secondary battery and the method for manufacturing same in the present embodiment will be described with reference to FIGS. 6 to 8. FIG. 6 is a view showing laser output ratios and fused states in Examples 1 to 8 and Comparative Examples 1 to 16, FIG. 7 is a view showing boundary surface penetration depths, tensile strengths, and evaluations in Examples 1 to 3 and Comparative Examples 1 and 2, and FIG. 8 is a cross sectional view showing a state of butt welding between a battery lid and a battery case in a comparative example.

In each example and each comparative example, an appropriate range of the value of [battery case-side welding depth D2/battery lid-side welding depth D1]×100%, which is a ratio between battery case-side welding depth D2 and battery lid-side welding depth D1, was verified. As an evaluation method, (a) a penetration depth of a boundary surface (the battery lid-side welding depth and the battery case-side welding depth) was measured through observation of a cross section of a welded portion, with n being set to 10. It is noted that, even in a case where a crack occurred, the crack was not included in dimensions. In addition, (b) a tensile test which applied a force to battery lid 1 in a vertically upward direction was performed.

In each example and each comparative example, A1050 (t1=1.4 mm) was used for battery lid 1, and A3003 (t2=0.4 mm) was used for battery case 2. First laser beam LB1 was emitted to battery lid 1 (the lid side in FIG. 6), and second laser beam LB2 was emitted to battery case 2 (the case side in FIG. 6). First laser beam LB1 and second laser beam LB2 were emitted at locations which were equally spaced from boundary BL between battery lid 1 and battery case 2, by 0.15 mm (see FIG. 3). The total output of first laser beam LB1 and second laser beam LB2 is 135 W. The output ratios between first laser beam LB1 and second laser beam LB2 are shown in FIG. 6. The speed of welding by first laser beam LB1 and second laser beam LB2 is 24 m/min.

Example 1

In Example 1, an output of first laser beam LB1 was set to 831 W, and an output of second laser beam LB2 was set to 519 W. Accordingly, the laser beam output ratio is 1.6:1. In both first laser beam LB1 and second laser beam LB2, an emitted laser beam diameter is 0.04 mm, and its ratio relative to the plate thicknesses of battery lid 1 and battery case 2 is 10%.

Under the above conditions, battery lid-side welding depth D1 from surface S of battery lid 1 was 0.73 mm, and battery case-side welding depth D2 from surface S of battery lid 1 was 0.47 mm. Accordingly, [battery case-side welding depth D2/battery lid-side welding depth D1]×100% has a value of 65%.

Example 2

In Example 2, an output of first laser beam LB1 was set to 799 W, and an output of second laser beam LB2 was set to 551 W. Accordingly, the laser beam output ratio is 1.45:1. In both first laser beam LB1 and second laser beam LB2, an emitted laser beam diameter is 0.04 mm, and its ratio relative to the plate thicknesses of battery lid 1 and battery case 2 is 10%.

Under the above conditions, battery lid-side welding depth D1 from surface S of battery lid 1 was 0.69 mm, and battery case-side welding depth D2 from surface S of battery lid 1 was 0.51 mm. Accordingly, [battery case-side welding depth D2/battery lid-side welding depth D1]×100% has a value of 75%.

Example 3

In Example 3, an output of first laser beam LB1 was set to 763 W, and an output of second laser beam LB2 was set to 587 W. Accordingly, the laser beam output ratio is 1.3:1. In both first laser beam LB1 and second laser beam LB2, an emitted laser beam diameter is 0.04 mm, and its ratio relative to the plate thicknesses of battery lid 1 and battery case 2 is 10%.

Under the above conditions, battery lid-side welding depth D1 from surface S of battery lid 1 was 0.65 mm, and battery case-side welding depth D2 from surface S of battery lid 1 was 0.55 mm. Accordingly, [battery case-side welding depth D2/battery lid-side welding depth D1]×100% has a value of 85%.

Example 4

In Example 4, an output of first laser beam LB1 was set to 868 W, and an output of second laser beam LB2 was set to 482 W. Accordingly, the laser beam output ratio is 1.8:1. In both first laser beam LB1 and second laser beam LB2, an emitted laser beam diameter is 0.08 mm, and its ratio relative to the plate thicknesses of battery lid 1 and battery case 2 is 20%.

Under the above conditions, battery lid-side welding depth D1 from surface S of battery lid 1 was 0.72 mm, and battery case-side welding depth D2 from surface S of battery lid 1 was 0.42 mm. Accordingly, [battery case-side welding depth D2/battery lid-side welding depth D1]×100% has a value of 58%.

Example 5

In Example 5, an output of first laser beam LB1 was set to 831 W, and an output of second laser beam LB2 was set to 519 W. Accordingly, the laser beam output ratio is 1.6:1. In both first laser beam LB1 and second laser beam LB2, an emitted laser beam diameter is 0.08 mm, and its ratio relative to the plate thicknesses of battery lid 1 and battery case 2 is 20%.

Under the above conditions, battery lid-side welding depth D1 from surface S of battery lid 1 was 0.71 mm, and battery case-side welding depth D2 from surface S of battery lid 1 was 0.45 mm. Accordingly, [battery case-side welding depth D2/battery lid-side welding depth D1]×100% has a value of 63%.

Example 6

In Example 6, an output of first laser beam LB1 was set to 799 W, and an output of second laser beam LB2 was set to 551 W. Accordingly, the laser beam output ratio is 1.45:1. In both first laser beam LB1 and second laser beam LB2, an emitted laser beam diameter is 0.08 mm, and its ratio relative to the plate thicknesses of battery lid 1 and battery case 2 is 20%.

Under the above conditions, battery lid-side welding depth D1 from surface S of battery lid 1 was 0.61 mm, and battery case-side welding depth D2 from surface S of battery lid 1 was 0.49 mm. Accordingly, [battery case-side welding depth D2/battery lid-side welding depth D1]×100% has a value of 80%.

Example 7

In Example 7, an output of first laser beam LB1 was set to 763 W, and an output of second laser beam LB2 was set to 587 W. Accordingly, the laser beam output ratio is 1.3:1. In both first laser beam LB1 and second laser beam LB2, an emitted laser beam diameter is 0.08 mm, and its ratio relative to the plate thicknesses of battery lid 1 and battery case 2 is 20%.

Under the above conditions, battery lid-side welding depth D1 from surface S of battery lid 1 was 0.63 mm, and battery case-side welding depth D2 from surface S of battery lid 1 was 0.53 mm. Accordingly, [battery case-side welding depth D2/battery lid-side welding depth D1]×100% has a value of 84%.

Example 8

In Example 8, an output of first laser beam LB1 was set to 707 W, and an output of second laser beam LB2 was set to 643 W. Accordingly, the laser beam output ratio is 1.1:1. In both first laser beam LB1 and second laser beam LB2, an emitted laser beam diameter is 0.08 mm, and its ratio relative to the plate thicknesses of battery lid 1 and battery case 2 is 20%.

Under the above conditions, battery lid-side welding depth D1 from surface S of battery lid 1 was 0.61 mm, and battery case-side welding depth D2 from surface S of battery lid 1 was 0.55 mm. Accordingly, [battery case-side welding depth D2/battery lid-side welding depth D1]×100% has a value of 90%.

Comparative Example 1

In Comparative Example 1, an output of first laser beam LB1 was set to 691 W, and an output of second laser beam LB2 was set to 659 W. Accordingly, the laser beam output ratio is 1.05:1. In both first laser beam LB1 and second laser beam LB2, an emitted laser beam diameter is 0.04 mm, and its ratio relative to the plate thicknesses of battery lid 1 and battery case 2 is 10%.

Under the above conditions, battery lid-side welding depth D1 from surface S of battery lid 1 was 0.60 mm, and battery case-side welding depth D2 from surface S of battery lid 1 was 0.60 mm. Accordingly, [battery case-side welding depth D2/battery lid-side welding depth D1]×100% has a value of 100%.

Comparative Example 2

In Comparative Example 2, an output of first laser beam LB1 was set to 675 W, and an output of second laser beam LB2 was set to 675 W. Accordingly, the laser beam output ratio is 1:1. In both first laser beam LB1 and second laser beam LB2, an emitted laser beam diameter is 0.04 mm, and its ratio relative to the plate thicknesses of battery lid 1 and battery case 2 is 10%.

Under the above conditions, battery lid-side welding depth D1 from surface S of battery lid 1 was 0.55 mm, and battery case-side welding depth D2 from surface S of battery lid 1 was 0.65 mm. Accordingly, [battery case-side welding depth D2/battery lid-side welding depth D1]×100% has a value of 110%. In a state where battery case-side welding depth D2 is formed to be deeper than battery lid-side welding depth D1 as described above, a cross sectional shape as shown in FIG. 8 is obtained.

Comparative Example 3

In Comparative Example 3, an output of first laser beam LB1 was set to 868 W, and an output of second laser beam LB2 was set to 482 W. Accordingly, the laser beam output ratio is 1.8:1. In both first laser beam LB1 and second laser beam LB2, an emitted laser beam diameter is 0.02 mm, and its ratio relative to the plate thicknesses of battery lid 1 and battery case 2 is 5%. Under the above conditions, bonding by welding did not occur.

Comparative Example 4

In Comparative Example 4, an output of first laser beam LB1 was set to 831 W, and an output of second laser beam LB2 was set to 519 W. Accordingly, the laser beam output ratio is 1.6:1. In both first laser beam LB1 and second laser beam LB2, an emitted laser beam diameter is 0.02 mm, and its ratio relative to the plate thicknesses of battery lid 1 and battery case 2 is 5%. Under the above conditions, bonding by welding did not occur.

Comparative Example 5

In Comparative Example 5, an output of first laser beam LB1 was set to 799 W, and an output of second laser beam LB2 was set to 551 W. Accordingly, the laser beam output ratio is 1.45:1. In both first laser beam LB1 and second laser beam LB2, an emitted laser beam diameter is 0.02 mm, and its ratio relative to the plate thicknesses of battery lid 1 and battery case 2 is 5%. Under the above conditions, bonding by welding did not occur.

Comparative Example 6

In Comparative Example 6, an output of first laser beam LB1 was set to 763 W, and an output of second laser beam LB2 was set to 587 W. Accordingly, the laser beam output ratio is 1.3:1. In both first laser beam LB1 and second laser beam LB2, an emitted laser beam diameter is 0.02 mm, and its ratio relative to the plate thicknesses of battery lid 1 and battery case 2 is 5%. Under the above conditions, bonding by welding did not occur.

Comparative Example 7

In Comparative Example 7, an output of first laser beam LB1 was set to 707 W, and an output of second laser beam LB2 was set to 643 W. Accordingly, the laser beam output ratio is 1.1:1. In both first laser beam LB1 and second laser beam LB2, an emitted laser beam diameter is 0.02 mm, and its ratio relative to the plate thicknesses of battery lid 1 and battery case 2 is 5%. Under the above conditions, bonding by welding did not occur.

Comparative Example 8

In Comparative Example 8, an output of first laser beam LB1 was set to 691 W, and an output of second laser beam LB2 was set to 659 W. Accordingly, the laser beam output ratio is 1.05:1. In both first laser beam LB1 and second laser beam LB2, an emitted laser beam diameter is 0.02 mm, and its ratio relative to the plate thicknesses of battery lid 1 and battery case 2 is 5%. Under the above conditions, bonding by welding did not occur.

Comparative Example 9

In Comparative Example 9, an output of first laser beam LB1 was set to 675 W, and an output of second laser beam LB2 was set to 675 W. Accordingly, the laser beam output ratio is 1:1. In both first laser beam LB1 and second laser beam LB2, an emitted laser beam diameter is 0.02 mm, and its ratio relative to the plate thicknesses of battery lid 1 and battery case 2 is 5%. Under the above conditions, bonding by welding did not occur.

Comparative Example 10

In Comparative Example 10, an output of first laser beam LB1 was set to 868 W, and an output of second laser beam LB2 was set to 482 W. Accordingly, the laser beam output ratio is 1.8:1. In both first laser beam LB1 and second laser beam LB2, an emitted laser beam diameter is 0.12 mm, and its ratio relative to the plate thicknesses of battery lid 1 and battery case 2 is 25%.

Under the above conditions, battery lid-side welding depth D1 from surface S of battery lid 1 was 0.75 mm, whereas a peak in a welding depth direction did not occur on the battery case 2 side.

Comparative Example 11

In Comparative Example 11, an output of first laser beam LB1 was set to 831 W, and an output of second laser beam LB2 was set to 519 W. Accordingly, the laser beam output ratio is 1.6:1. In both first laser beam LB1 and second laser beam LB2, an emitted laser beam diameter is 0.12 mm, and its ratio relative to the plate thicknesses of battery lid 1 and battery case 2 is 25%. Under the above conditions, battery lid-side welding depth D1 from surface S of battery lid 1 was 0.73 mm, whereas a peak in the welding depth direction did not occur on the battery case 2 side.

Comparative Example 12

In Comparative Example 12, an output of first laser beam LB1 was set to 799 W, and an output of second laser beam LB2 was set to 551 W. Accordingly, the laser beam output ratio is 1.45:1. In both first laser beam LB1 and second laser beam LB2, an emitted laser beam diameter is 0.12 mm, and its ratio relative to the plate thicknesses of battery lid 1 and battery case 2 is 25%.

Under the above conditions, battery lid-side welding depth D1 from surface S of battery lid 1 was 0.69 mm, whereas a peak in the welding depth direction did not occur on the battery case 2 side.

Comparative Example 13

In Comparative Example 13, an output of first laser beam LB1 was set to 763 W, and an output of second laser beam LB2 was set to 587 W. Accordingly, the laser beam output ratio is 1.3:1. In both first laser beam LB1 and second laser beam LB2, an emitted laser beam diameter is 0.12 mm, and its ratio relative to the plate thicknesses of battery lid 1 and battery case 2 is 25%.

Under the above conditions, battery lid-side welding depth D1 from surface S of battery lid 1 was 0.65 mm, whereas a peak in the welding depth direction did not occur on the battery case 2 side.

Comparative Example 14

In Comparative Example 14, an output of first laser beam LB1 was set to 707 W, and an output of second laser beam LB2 was set to 643 W. Accordingly, the laser beam output ratio is 1.1:1. In both first laser beam LB1 and second laser beam LB2, an emitted laser beam diameter is 0.12 mm, and its ratio relative to the plate thicknesses of battery lid 1 and battery case 2 is 25%.

Under the above conditions, battery lid-side welding depth D1 from surface S of battery lid 1 was 0.63 mm, whereas a peak in the welding depth direction did not occur on the battery case 2 side.

Comparative Example 15

In Comparative Example 15, an output of first laser beam LB1 was set to 691 W, and an output of second laser beam LB2 was set to 659 W. Accordingly, the laser beam output ratio is 1.05:1. In both first laser beam LB1 and second laser beam LB2, an emitted laser beam diameter is 0.12 mm, and its ratio relative to the plate thicknesses of battery lid 1 and battery case 2 is 25%.

Under the above conditions, battery lid-side welding depth D1 from surface S of battery lid 1 was 0.60 mm, whereas a peak in the welding depth direction did not occur on the battery case 2 side.

Comparative Example 16

In Comparative Example 16, an output of first laser beam LB1 was set to 675 W, and an output of second laser beam LB2 was set to 675 W. Accordingly, the laser beam output ratio is 1:1. In both first laser beam LB1 and second laser beam LB2, an emitted laser beam diameter is 0.12 mm, and its ratio relative to the plate thicknesses of battery lid 1 and battery case 2 is 25%.

Under the above conditions, battery lid-side welding depth D1 from surface S of battery lid 1 was 0.55 mm, whereas a peak in the welding depth direction did not occur on the battery case 2 side.

The results of Comparative Examples 3 to 9 described above show that, when the emitted laser beam diameter has a low ratio (5%) relative to the plate thicknesses of battery lid 1 and battery case 2, a fused region is also thin and cannot fill the gap (g1) between battery lid 1 and battery case 2. Further, the results of Comparative Examples 12 to 18 described above show that, when the emitted laser beam diameter has a high ratio (25%) relative to the plate thicknesses of battery lid 1 and battery case 2, the fusion region is also thick, and thus a peak in the welding depth direction does not occur on the battery case 2 side, and a fused shape as shown in FIG. 2 cannot be obtained.

Therefore, it can be said that, preferably, the emitted laser beam diameter of the first laser beam is a beam diameter which is 10% to 20% of the thickness (t1) of battery lid 1, and the emitted laser beam diameter of the second laser beam is a beam diameter which is 10% to 20% of the thickness (t2) of battery case 2.

Next, penetration depth D3 (see FIG. 2), a tensile strength (N/mm) of battery lid 1, and evaluation in each of Examples 1 to 3 and Comparative Examples 1 and 2 will be described with reference to FIG. 7. It is noted that, as for the value of penetration depth D3 and the value of the tensile strength (N/mm) of battery lid 1, the minimum value and the maximum value obtained with n being set to 10 are indicated in parentheses, and the average value is indicated as a representative value.

In Example 1, penetration depth D3 was 0.58 mm, and the tensile strength was 58 (N/mm). When battery case-side welding depth D2 (case peak) is 65% relative to battery lid-side welding depth D1 (lid peak), fusion is enough to fill the gap (g1) between battery lid 1 and battery case 2, and penetration depth D3 is stabilized. As a result, in the tensile test, rupture occurs from a boundary between a fused portion and battery case 2 (thick broken line L11 in FIG. 5).

In Example 2, penetration depth D3 was 0.62 mm, and the tensile strength was 61 (N/mm). When battery case-side welding depth D2 (case peak) is 75% relative to battery lid-side welding depth D1 (lid peak), no crack occurred in the penetration, and a tensile strength higher than that in Example 1 was obtained in the tensile test. Rupture occurs from a boundary between a fused portion and battery case 2 (thick broken line L11 in FIG. 5), as in Example 1.

In Example 3, penetration depth D3 was 0.65 mm, and the tensile strength was 62 (N/mm). When battery case-side welding depth D2 (case peak) is 85% relative to battery lid-side welding depth D1 (lid peak), no crack occurred in the penetration, and a tensile strength further higher than that in Example 2 was obtained in the tensile test. Rupture occurs from a boundary between a fused portion and battery case 2 (thick broken line L11 in FIG. 5), as in Examples 1 and 2.

Based on the evaluation results of Examples 1 to 3 described above, it is preferable that [battery case-side welding depth (D2)/battery lid-side welding depth (D1)]× 100%, which is a ratio between battery case-side welding depth D2 and battery lid-side welding depth D1, has a value of 65% to 85%. Further, it is preferable that the intensity of the first laser beam is 1.3 to 1.6 times greater than the intensity of the second laser beam.

In Comparative Example 1, penetration depth D3 was 0.64 mm, and the tensile strength was 30 (N/mm). When battery lid 1 and battery case 2 had similar fusion amounts, solidification was started earlier from the battery lid 1 side due to the magnitude of heat capacity, and a crack occurred in battery case 2, causing a reduction in tensile strength.

In Comparative Example 2, penetration depth D3 was 0.60 mm, and the tensile strength was 18 (N/mm). Since battery lid 1 had a small heat input and a large heat capacity, battery lid 1 solidified earlier, and a crack occurred in battery case 2, causing a reduction in tensile strength.

As described above, according to the secondary battery and the method for manufacturing the same in the present embodiment, in the secondary battery in which battery lid 1 is fixed to battery case 2 by butt welding by emitting laser beams, battery lid-side welding depth D1 is formed to be deeper than battery case-side welding depth D2. Thereby, the battery lid 1 side is welded greater than the battery case 2 side, and thus battery lid 1 is in a higher temperature state than battery case 2. As a result, solidification is started from the side of battery case 2 having a relatively low temperature, and occurrence of a crack on the battery case 2 side can be suppressed.

Although the embodiment of the present invention has been described, it should be understood that the embodiment disclosed herein is illustrative and non-restrictive in every respect. The scope of the present invention is defined by the scope of the claims, and is intended to include any modifications within the scope and meaning equivalent to the scope of the claims.

What is claimed is:

1. A secondary battery in which a battery lid is fixed to a battery case by inserting said battery lid into an opening of said battery case having said opening, and emitting laser beams to a butting portion between said battery case and said battery lid to perform butt welding, wherein
when a battery lid-side welding mark formed in said battery lid has a distance from a surface of said battery lid to a lowest end of said battery lid-side welding mark which is defined as a battery lid-side welding depth, and a battery case-side welding mark formed in said battery case has a distance from the surface of said battery lid to a lowest end of said battery case-side welding mark which is defined as a battery case-side welding depth, said battery lid-side welding depth is deeper than said battery case-side welding depth, and
a ratio between said battery case-side welding depth and said battery lid-side welding depth has a value of 65% to 85%.

2. The secondary battery according to claim 1, having a penetration region between said battery lid-side welding mark and said battery case-side welding mark, wherein a distance from the surface of said battery lid to a lowest end of the penetration region has a depth shallower than said battery lid-side welding depth and said battery case-side welding depth.

3. The secondary battery according to claim 1, wherein a heat capacity of the battery lid is larger than a heat capacity of the battery case.

* * * * *